United States Patent Office 3,423,375
Patented Jan. 21, 1969

3,423,375
NEUTRON RADIATION SORBERS
Norman S. Strand, Midland, Mich., assignor to The Dow Chemical Company, Midland, Mich., a corporation of Delaware
No Drawing. Filed Nov. 29, 1963, Ser. No. 327,103
U.S. Cl. 260—79.3     2 Claims
Int. Cl. G21f 1/10; C08f 27/04, 27/07

ABSTRACT OF THE DISCLOSURE

Polyethylene sulfonates of a metal having a thermal neutron cross section greater than 33.6±1 barns have excellent neutron capture ability.

---

This invention concerns metallo polyethylene sulfonate layers and blocks which are useful as neutron radiation sorbers.

Polyethylene in layers and blocks has been used for protection from neutron radiation associated with atomic fission after such radiation has passed through primary shielding. Other materials dispersed in polyethylene, hereinafter PE, have been used to absorb slowed down neutrons. These materials include boron, cadmium and hafnium, which have a high rate of neutron absorption or high neutron cross-section.

It has now been discovered that layers and blocks of polyethylene sulfonates of one or more metals which have a high cross-section and which do not become radioactive upon neutron capture are even more effective as neutron sorbers because (1) the salt form metals as PE sulfonates are uniformly dispersed throughout the PE sulfonate and (2) the PE metallo sulfonate salts have much higher melting points than PE and, therefore, are much more resistant to thermal deterioration resulting from neutron capture than are PE's containing mechanically dispersed neutron sorbers.

The PE sulfonates useful in the practice of this invention are prepared from any linear or substantially linear resinous polymeric ethylenes which are sulfonated by procedures similarly to the sulfonation procedures used for sulfonating polystyrene, as taught in U.S. Patents 2,500,149 and 2,764,563. Advantageously, sulfonation is carried out on PE in particulate form. The procedures for sulfonating PE as taught in U.S. Patent 2,937,066 are also operable. A preferred method for sulfonating PE involves swelling particulate PE with a swelling agent, e.g., methylene dichloride, and sulfonating the swollen PE in chlorosulfonic acid dissolved in methylene dichloride at a temperature ranging between 0° and 20° C. for a time sufficient to attain the desired degree of sulfonation, advantageously up to a maximum of ca. 5 meq. ion exchange capacity per gram of sulfonated PE.

Salts of sulfonated PE which are effective as neutron sorbers are those of metals having a thermal neutron cross section greater than that of chlorine (cross section of 33.6±1.1 barns), i.e., lithium, cobalt, rhodium, silver, cadmium, indium, neodymium, samarium, europium, gadolinium, terbium, dysprosium, holmium, erbium, thulium, ytterbium, lutetium, hafnium, rhenium, iridium, gold and mercury. Of these, cadmium (cross section 2450±50 barns), mercury (cross section 380±20 barns), samarium (cross section 5600±200 barns), gadolinium (cross section 46000±1000 barns), europium (cross section 4300±100 barns), dysprosium (cross section 950±50 barns), iridium (cross section 440±20 barns) are particularly effective. They are prepared by reacting PE sulfonate in acid or alkali metal salt form with a water-soluble salt of one of the indicated metals in amount at least sufficient, and preferably in excess, to give the desired PE sulfonate salt, advantageously by mixing the reactants in aqueous medium, and thereafter washing with water if necessary to remove by-product salts.

An added improvement in the already improved thermal stability of the PE sulfonate layers and blocks is attained by a surface crosslinking treatment. Surface crosslinking is accomplished by immersing a layer or block of a PE sulfonate salt in acid, exchanging metal ions on or near the surface for protons, then heating such layer or block at an elevated temperature, advantageously 50° to 100° C., for one hour or more to give sulfone crosslinks, as determined by infrared spectroscopy. Sulfone formation is pictured as follows:

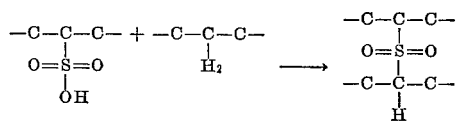

The metallo PE sulfonate is extruded, similarly to PE, to give relatively thick layers, e.g., ⅛ to 4 in. thick, 5 to 8 ft. long for ready handling and 3 to 4 ft. wide. Alternatively it is molded under pressure or with heat and pressure, in ways utilized for molding PE, to give thick layers or blocks. Multiple layers or blocks can be used to provide a desired thickness.

The following example describes completely a representative specific embodiment and the best mode contemplated by the inventor of carrying out the invention. It is not to be considered as limiting the invention other than as defined in the claims.

Example 1

A series of 12 mil thick layers of untreated PE, (A) Cd salt form of PE sulfonate, (B) Cd salt form of PE sulfonate with surface crosslinking as previously described, (C) and acid form of PE sulfonate, (D) are analyzed for thermal neutron absorption properties by wrapping two 6 mil thick layers of each around a gold monitor foil and determining the relative decrease of gold activity observed. Results follow:

TABLE

|   | M.P., ° C. | Rel. Decrease of Gold Activity, Percent |
|---|---|---|
| A | 120 | 10±3 |
| B | 230 | 29±3 |
| C | >300 | 25±3 |
| D |  | 0 |

It is apparent that Cd PE sulfonate is considerably more effective than PE as a neutron sorber, and that surface crosslinked Cd PE sulfonate has a higher melting point than Cd PE sulfonate. Neutron sorption increases with thickness of layer or block of metallo PE sulfonate.

When the lithium, cobalt, rhodium, silver, indium, neodymium, samarium, europium, gadolinium, terbium, dysprosium, holmium, erbium, thulium, ytterbium, lutetium, hafnium, rhenium, iridium, gold and mercury PE sulfonates are substituted for the Cd PE sulfonate, there are also obtained neutron sorbers which are considerably more effective than PE. The improvement is further increased by surface crosslinking.

What is claimed is:
1. A composition of matter comprising a polyethylene sulfonate of a metal selected from the group consisting of lithium, cobalt, rhodium, silver, cadmium, indium, neodymium, samarium, europium, gadolinium, terbium, dysprosium, holmium, erbium, thulium, ytterbium, lutetium, hafnium, rhenium, iridium, gold and mercury.

2. A composition as defined in claim 1 wherein the thermal stability of said composition is increased by a surface crosslinking treatment.

No references cited.

JOSEPH L. SCHOFER, Primary Examiner.
D. K. DENENBERG, Assistant Examiner.

U.S. Cl. X.R.

252—478; 250—108